(12) United States Patent
Brofferio et al.

(10) Patent No.: US 10,103,684 B2
(45) Date of Patent: Oct. 16, 2018

(54) PHOTOVOLTAIC TILE

(71) Applicant: HOBBYT S.r.l., Milan (IT)

(72) Inventors: Sergio Brofferio, Milan (IT); Vittorio Canetta, Milan (IT)

(73) Assignee: Vittorio Canetta, Milan (IT)

( * ) Notice: Subject to any disclaimer, the term of this patent is extended or adjusted under 35 U.S.C. 154(b) by 0 days.

(21) Appl. No.: 14/649,435

(22) PCT Filed: Dec. 5, 2013

(86) PCT No.: PCT/IB2013/060657
§ 371 (c)(1),
(2) Date: Jun. 3, 2015

(87) PCT Pub. No.: WO2014/087362
PCT Pub. Date: Jun. 12, 2014

(65) Prior Publication Data
US 2015/0333690 A1     Nov. 19, 2015

(30) Foreign Application Priority Data

Dec. 6, 2012  (IT) .............................. MI2012A2087

(51) Int. Cl.
*H02S 20/25*     (2014.01)
*H02S 40/36*     (2014.01)

(52) U.S. Cl.
CPC .............. *H02S 20/25* (2014.12); *H02S 40/36* (2014.12); *Y02B 10/12* (2013.01)

(58) Field of Classification Search
CPC ......... Y02E 10/47; Y02E 10/50; Y02E 10/52; H02S 20/00; H02S 20/23; H02S 20/25; H01L 31/0543; H01L 31/052; H01L 31/02008; H01L 31/042; H01L 31/05
See application file for complete search history.

(56) References Cited

U.S. PATENT DOCUMENTS 5,571,338 A    11/1996  Kadonome et al.
6,259,375 B1 *  7/2001  Andras ................... B61L 29/24
                                                  340/321

(Continued)

FOREIGN PATENT DOCUMENTS

WO      2011004092        1/2011
WO      WO 2011004092 A1 *  1/2011

OTHER PUBLICATIONS

International Search Report issued in PCT Application No. PCT/IB2013/060657.

*Primary Examiner* — Bethany L Martin (57) ABSTRACT

The invention concerns a photovoltaic tile free from wires and respective connectors for the electrical connections among tiles. The electrical connections are made by bushings integrated in the tiles, in the overlapping areas thereof, and electrically connected one to another by a removable pin connector. The assembly composes a roofing surface made of several equal or alike tiles, in case suitably interfaced, positioned on surfaces exposed to sun rays such as roofs, roofings or something else. The photovoltaic tile is provided with a frame made of plastic material with conventional means for fastening to the roof rafters and is characterized by means for a stable electrical and mechanical connection among adjacent tiles.

20 Claims, 5 Drawing Sheets

(56) References Cited

U.S. PATENT DOCUMENTS

| | | | |
|---|---|---|---|
| 2004/0131444 A1* | 7/2004 | Franco | F16B 5/0208 |
| | | | 411/352 |
| 2007/0157963 A1 | 7/2007 | Metten | |
| 2010/0131108 A1* | 5/2010 | Meyer | H01L 31/048 |
| | | | 700/275 |
| 2011/0100439 A1* | 5/2011 | Clothier | H01R 31/00 |
| | | | 136/251 |
| 2011/0138711 A1* | 6/2011 | Seng | F24J 2/5207 |
| | | | 52/173.3 |
| 2011/0155206 A1 | 6/2011 | Lee | |
| 2011/0183540 A1* | 7/2011 | Keenihan | H01R 31/00 |
| | | | 439/345 |
| 2011/0203637 A1* | 8/2011 | Patton | F24J 5/5205 |
| | | | 136/244 |
| 2011/0290307 A1 | 12/2011 | Workman et al. | |
| 2012/0151856 A1* | 6/2012 | Azoulay | H02S 20/25 |
| | | | 52/173.3 |

* cited by examiner

PHOTOVOLTAIC TILE

CROSS-REFERENCE TO RELATED APPLICATIONS

This application is a 371 of PCT/IB2013/060657, filed Dec. 5, 2013, which claims the benefit of Italian Patent Application No. MI2012A002087, filed Dec. 6, 2012.

Field of the Invention

The present invention relates to a photovoltaic tile and to the predisposition thereof for constituting a roofing surface through a set of equal or alike tiles (in case suitably interfaced), positioned on surfaces exposed to sun rays such as roofs, roofings or something else, said tile being essentially composed of a supporting body for one or more photovoltaic panels, in particular a so-called photovoltaic module, and of one or more members for the electrical connection among adjacent tiles.

BACKGROUND OF THE INVENTION

Tiles of the above defined type are already known in the field. For example, the application WO 2011/004092 relates to a tile entailing a shaped base body on which a photovoltaic layer is applied and connected, through electrical connectors, to terminal sockets adapted to be inserted in similar sockets of other tiles, when the adjacent tiles are at least partially overlapped. Furthermore, the base bodies are shaped at their ends to determine a mutual mechanical constraint in the overlapped portion of the adjacent tiles.

However this structure, while allowing the removal of the electrical wires running from each tile to the main connector, has a complex and expensive construction and, in addition, is difficult to be laid, since it requires an absolute constructive and mounting accuracy for inserting the terminals of the overlapped tiles one to another. In addition, tiles of the discussed prior art are laid traditionally and can be displaced or moved by simply raising them, but every displacement thereof can damage the mentioned terminal sockets. The electrical connector does not mechanically strengthen the tiles and the tiles are not mechanically constrained to the roof.

Another photovoltaic tile is known also from document US 2011/0155206. According to this document, the adjacent tiles are mechanically connected one to another by projecting splines which are inserted in corresponding grooves. However, in such a document no electrical connection among adjacent tiles is specified and only one electrical connection through wire is provided for a single tile, called "first tile". Therefore, no teaching exists about electrical connection among tiles.

SUMMARY OF THE INVENTION

That being stated, the present invention concerns a conceptually different photovoltaic tile able to be more simply and cheaply implemented, adapted to be laid and fastened directly on roof rafters and stably constrained to the other equal tiles, while removing the wires coming out from each tile for the electrical connections, as provided in conventional embodiments, and further ensuring a continuity of the electrical connection among the same in perturbed atmospheric conditions too.

Further, the tile according to the invention allows to realize the best working conditions and to ensure an aesthetical appearance of the manufactured product of optimal level.

The mentioned tile is characterized by what is stated in the attached claims.

BRIEF DESCRIPTION OF THE DRAWINGS

In the accompanying drawings and in the following description these operative and structural features will be disclosed by way of example.

In the drawings.

DETAILED DESCRIPTION OF THE INVENTION

Figure 1:
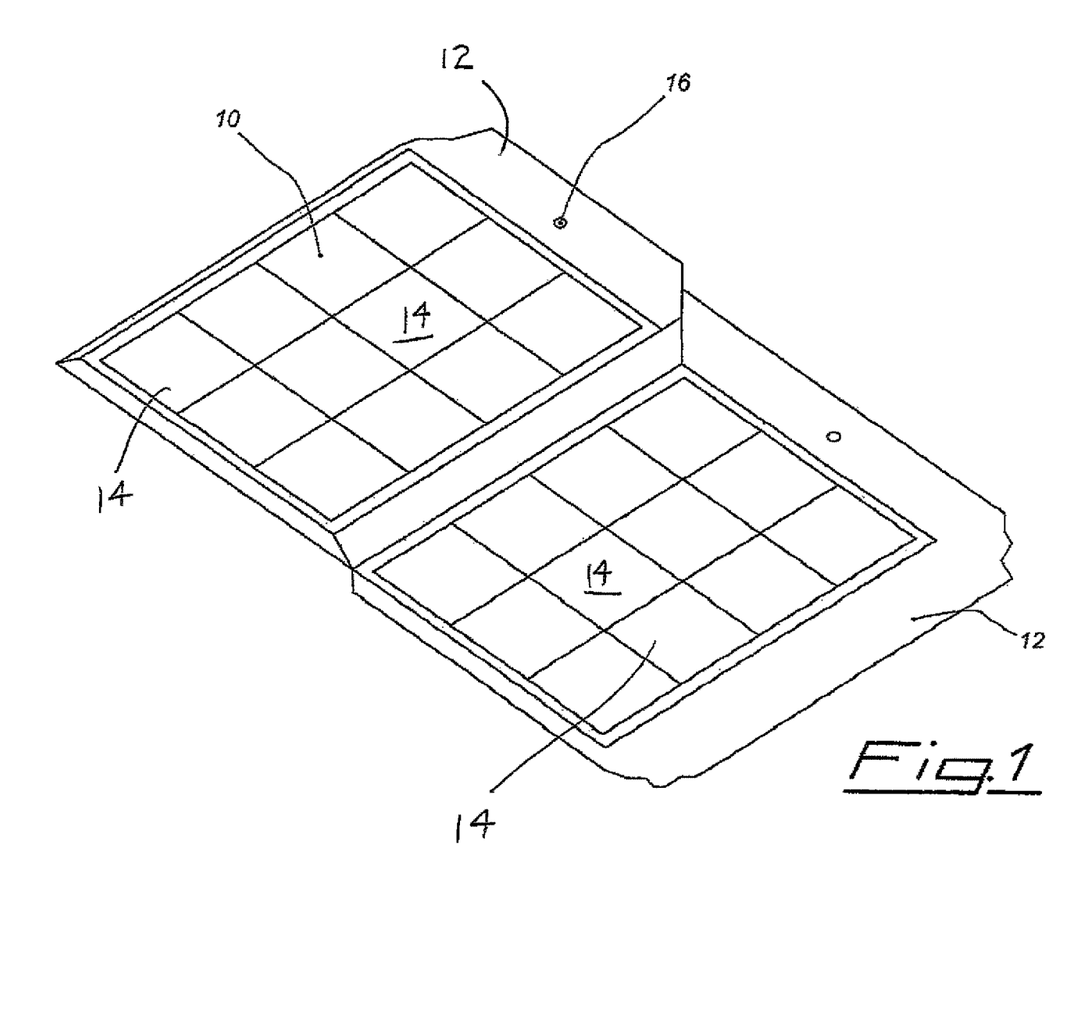
FIG. 1 is a perspective view of a tile according to the invention.
Figure 2:
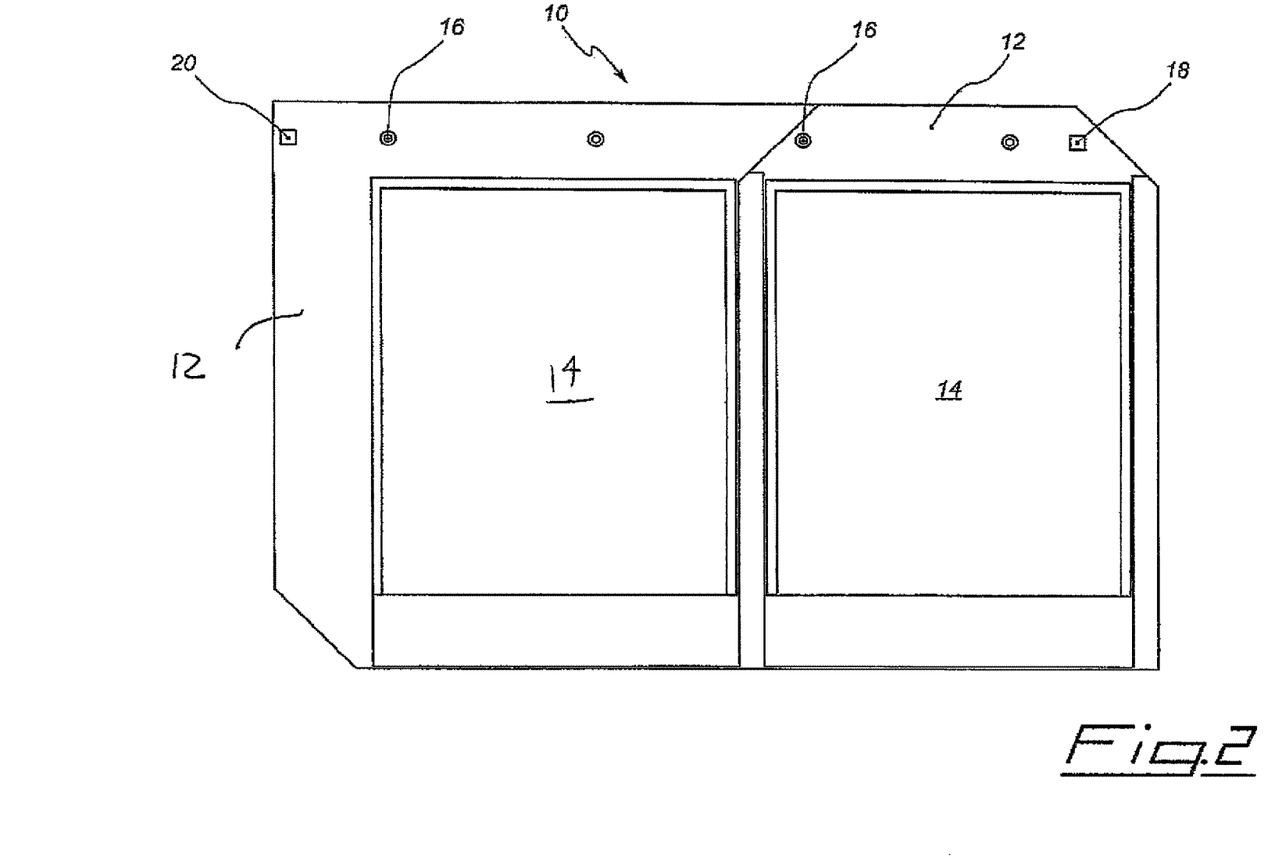
FIG. 2 is a plan view of the tile of FIG. 1.
Figure 3:
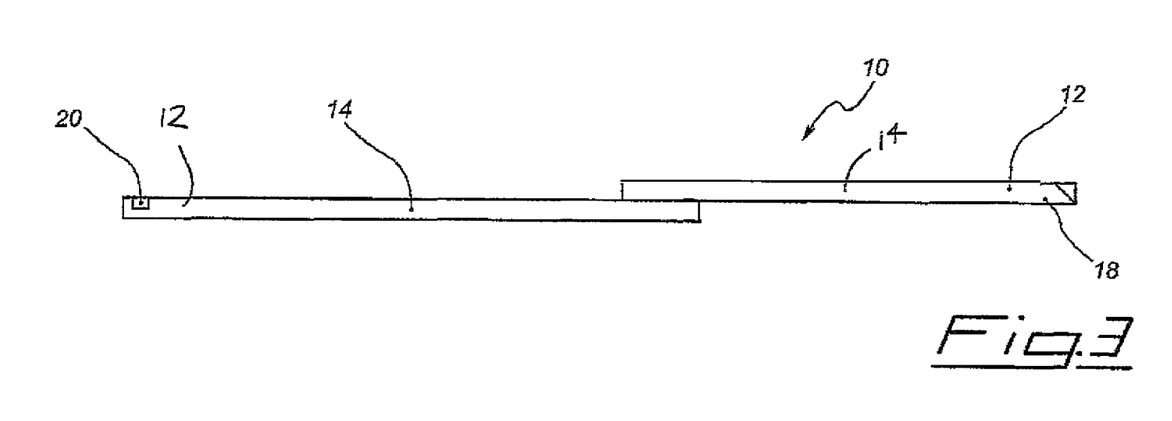
FIG. 3 is a section of the tile of FIGS. 1 and 2.

Referring at first to FIGS. 1 to 3, the tile 10 is essentially composed of a frame 12 made of plastic material, for example a polymer reinforced with cup fibers, preferably colored, supporting one or more photovoltaic modules 14, in case also colored, which are constrained for example by bonding to the frame 12. The frame 12, under the module 14, has at least one opening inside thereof in which air, adapted for cooling the inner surface of the module or modules and improving the efficiency thereof, can be circulated.

In the illustrated case, the tile is composed of two flat parallel areas located at different heights, but it could be composed also of a substantially flat member with lowered and/or raised areas at the ends to allow a partial overlapping of the tiles themselves. The photovoltaic tile 10 may be characterized in that the supporting body is composed of a frame 12 that includes one or more frame portions connected to one another and made of plastic material. The one or more frame portions of frame 12 of the supporting body may be parallel and not coplanar. The one or more frame portions are joined together in an overlapping manner to form frame 12. Frame 12 may support one or more photovoltaic modules and, as shown in FIGS. 1-3, each portion of frame 12 may support a photovoltaic module 14.

On a side, the tile 10 has holes 16 intended for stably fastening the tile itself to the roof rafters. The tiles further have laterally, along the roof slope, shapings (not shown) having the shape of ditch and protrusion, respectively, which are mutually inserted and also create a water transition barrier.

At the two ends, for example on the side connected to the roof rafters, each tile has a couple of connecting members 18 and 20 that will be described hereinafter and allow an electrical connection allowing to eliminate the need of using flying or fixed wires, as provided in the majority of known art cases. Further, a stable mutual mechanical fastening of adjacent and overlapped tiles is provided, preferably, but not necessarily, made through the same mentioned members for electrical connection.

Figure 4:
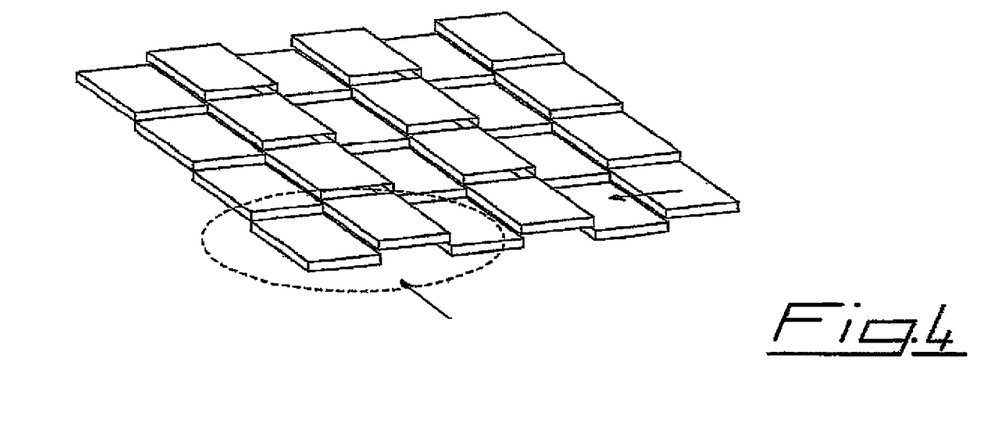
FIG. 4 is a perspective illustration of a group of installed tiles according to the invention.

The tiles are therefore adapted to be installed as shown for example in FIG. 4, partially overlapping both horizontally and along the roof slope.

Figure 5:
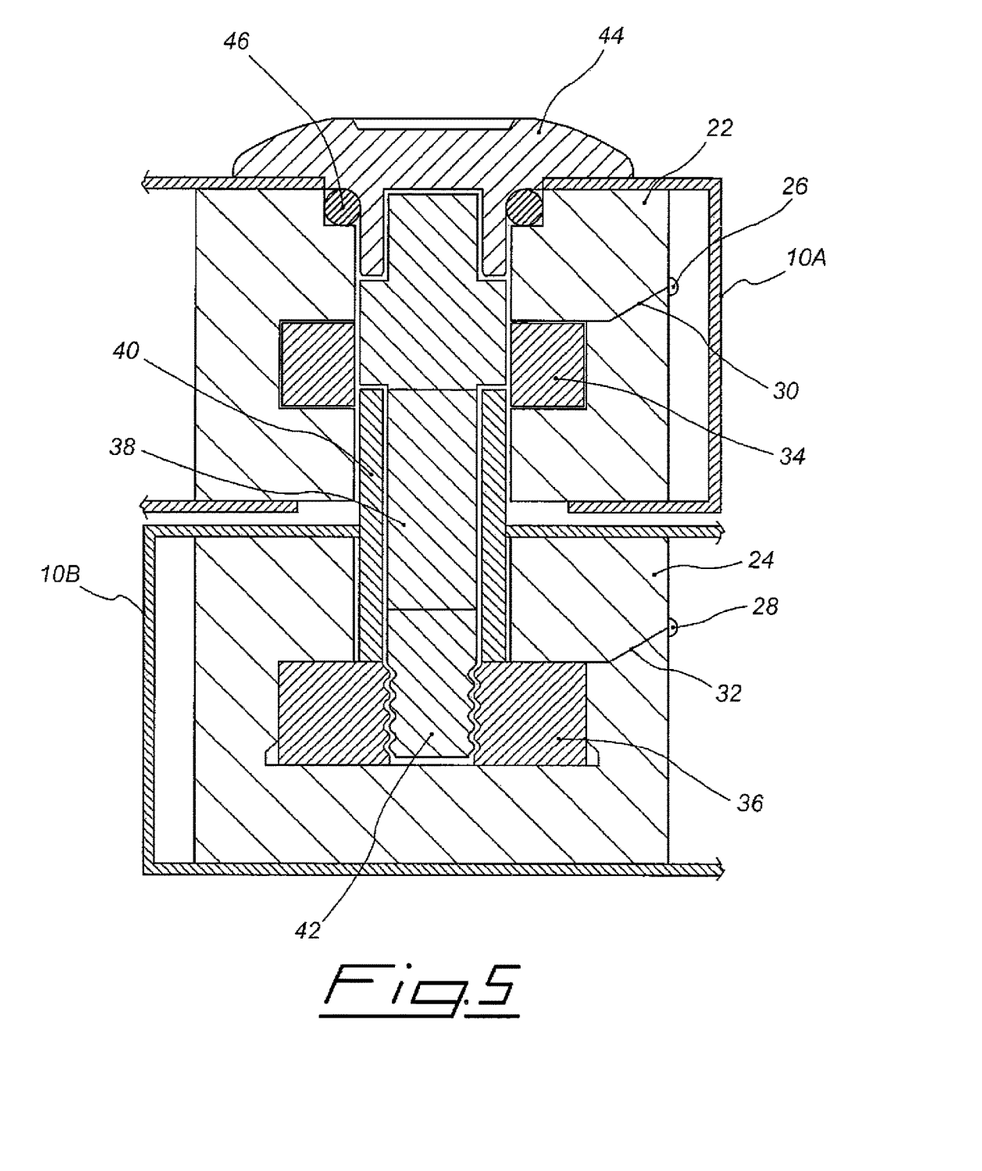
FIG. 5 is a schematic section of the means for the electrical and mechanical connection between two adjacent and partially overlapped tiles.

In FIG. 5 a first embodiment is shown of the means according to the invention used for mechanically and electrically constraining the adjacent tiles.

It has to be premised that the modules of each tile are electrically connected one to another in a way per se known, and that at the output of the photovoltaic tile two conductors are provided, which remain inside the tile and are electrically connected in the positions 18 and 20.

Coming back to FIG. 5, it is shown the connection between two tiles 10A and 10B in the mutual overlapping area. Inside the frame of each tile a case is housed preferably of cup type 22-24 with a clamp 26-28 to lead the conductor 30-32 connected to the module into the cup itself. In the upper cup 22 a bushing 34 made of conductive material is housed, to which the conductor 30 depends, the bushing 34 being surrounded by insulating material filling the cup 22. Similarly, the conductor 32 electrically connects to a second conductive bushing 36 housed in the lower cup 24 and immersed too in the insulating material filling the cup 24.

The electrical and mechanical connection is implemented by means of a pin member 38 that is axially inserted in the two cups 22, 24 for electrically and mechanically connecting the bushings 34 and 36 one to another. The pin member 38 is provided with an insulating tube 40 acting as a gasket by pressing onto the lower bushing 36. In its lower part the pin member 38 has means for mechanically fastening to the lower bushing 36, for example by screw—nut screw system 42, as shown, but also by bayonet or the like. The pin member 38 has an integral head composed of an insulating plastic cap 44 provided with an O-ring 46 to ensure a perfect tight against rainwater since it closes the insertion opening into the upper tile.

It has to be noted that the opening for inserting the pin 38 into the upper tile has a diameter slightly greater than the diameter of the pin itself, to allow adjustments during the installation of tiles. For the same reason, the insulating material filling the cup 22 is advantageously at least partially elastic to improve a possible adjustment of the pin position and thus of the mutual position of the installed tiles.

Figure 6:
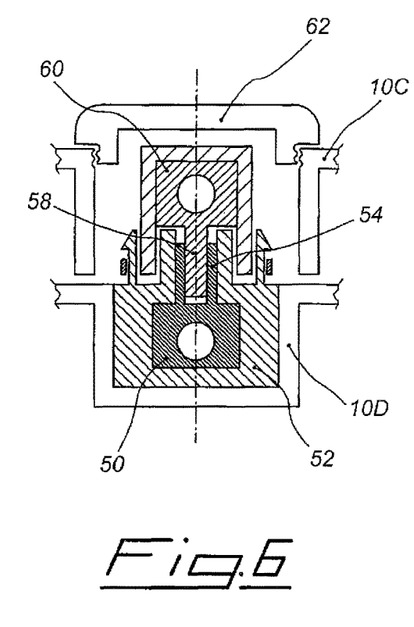
FIG. 6 is a schematic section, in a front view, of an alternative embodiment of the means for the mechanical and electrical connection.
Figure 7:
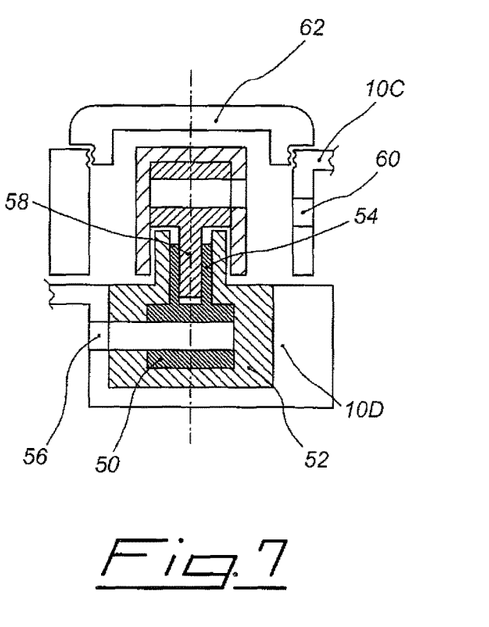
FIG. 7 is a side view, always in section, of the means illustrated in FIG. 6

A different embodiment is shown in FIGS. 6 and 7, where the electrical and mechanical connection is a snap fit. According to this embodiment, the lower tile 10D has a female member 50 made of conductive material, buried in an insulating component 52 and that has a hollow projecting part 54 intended for the contact. The female 50 is connected at the underside to the wire 56. In the hollow projecting part 54 a pin member 58 is adapted to be inserted, the latter being made of a conductive material properly insulated, to which the wire 60 of the upper tile 10C is connected. The opening of the upper tile 10C is then closed by a watertight plug 62, which can be screwed, bayonet inserted or the like.

Substantially, therefore, through the illustrated means for electrical and mechanical connection integrated to the photovoltaic tiles according to the invention, a stable fastening of the same tiles one to another is obtained. The tiles are provided with photovoltaic modules adapted to operate with the highest efficiency and without aesthetical impact, further resulting cost effective to realize and very easy to install.

The invention claimed is:

1. Photovoltaic tile adapted to be positioned, as partially overlapped to other equal or alike adjacent tiles, on surfaces exposed to sun rays, comprising:
   a supporting body;
   at least one discrete electrical connection member arranged on the supporting body and configured to allow electrical continuity with one of the adjacent tiles that is suitably interfaced;
   a photovoltaic module arranged at least on the supporting body,
   the at least one discrete electrical connection member including a mechanical fastener made of an electrically conductive material that allows a mechanical and electrical connection with at least one further respective electrical connection member of the one of the adjacent tiles and provides both an electrical connection and a stable mechanical constraint between the photovoltaic tile and the one of the adjacent tiles, wherein the photovoltaic tile includes a through opening that passes completely through the photovoltaic tile for receiving said at least one discrete electrical connection member,
   wherein the mechanical fastener includes an electrical and mechanical coupling pin that passes through the through opening and has an area that locks in an underlying portion of the adjacent tile, and a plastic cap disposed on an upper surface of the tile and having a diameter at least as wide as a diameter of the through opening,
   and wherein the supporting body comprises a first frame portion and a second frame portion and the first frame portion is disposed on and directly contacting the second frame portion in an overlapping manner such that the first and second frame portions are parallel.

2. Photovoltaic tile according to claim 1, wherein said at least one discrete electrical connection member comprises a plurality of discrete electrical connection members structured to concurrently make a stable mechanical constraint among a plurality of adjacent tiles.

3. Photovoltaic tile according to claim 1, wherein the at least one discrete electrical connection member is formed by a case made of insulating material, and a bushing made of conductive material electrically connected to the photovoltaic module and housed in the case, and the bushing and a further bushing of the one of the adjacent tiles is connected by the at least one electrical and mechanical coupling pin.

4. Photovoltaic tile according to claim 1, wherein the supporting body is made of plastic material.

5. Photovoltaic tile according to claim 4, wherein the supporting body houses the at least one discrete electrical connection member for mechanical and electrical coupling among adjacent tiles, and holes for fastening the tile to roof rafters.

6. Photovoltaic tile according to claim 4, wherein the frame laterally has grooves and projections cooperating for a mutual alignment between the tile and the one of the adjacent tiles and a water transition barrier.

7. A photovoltaic tile adapted to be positioned, as partially overlapped to other equal or alike adjacent tiles, on surfaces exposed to sun rays, comprising:
   a supporting body;
   at least one discrete electrical connection member arranged on the supporting body and configured to allow electrical continuity with one of the adjacent tiles that is suitably interfaced;
   a photovoltaic module arranged at least on the supporting body, the at least one discrete electrical connection member including a mechanical fastener made of an electrically conductive material that allows a mechanical and electrical connection with at least one further respective electrical connection member of the one of the adjacent tiles and provides both an electrical connection and a stable mechanical constraint between the photovoltaic tile and the one of the adjacent tiles, wherein the photovoltaic tile includes a through opening that passes completely through the photovoltaic tile for receiving said at least one discrete electrical connection member and the mechanical fastener includes an electrical and mechanical coupling pin that passes through the through opening and has an area that can be locked in an un underlying portion of the adjacent tile, and an axially extending insulating tube which extends from a conductive bushing of said photovoltaic tile to a conductive bushing of the adjacent photovoltaic tile and surrounds said electrical and mechanical coupling pin, acting as a gasket which deforms and has a portion that occupies space in the underlying portion of the adjacent tile, to ensure a tight seal.

8. Photovoltaic tile adapted to be positioned, as partially overlapped to other equal or alike adjacent tiles, on surfaces exposed to sun rays, comprising:

a supporting body comprising a first frame portion and a second frame portion, the first frame portion disposed on and directly contacting the second frame portion in an overlapping manner such that the first and second frame portions are parallel;

at least one discrete electrical connection member arranged on the supporting body and configured to allow electrical continuity with one of the adjacent tiles that is suitably interfaced;

a photovoltaic module arranged on each of the first and second frame portions of the supporting body, the at least one discrete electrical connection member including a mechanical fastener made of an electrically conductive material that allows a mechanical and electrical connection with at least one further respective electrical connection member of the one of the adjacent tiles and provides both an electrical connection and a stable mechanical constraint between the photovoltaic tile and the one of the adjacent tiles, wherein the photovoltaic tile includes a through opening that passes completely through the photovoltaic tile for receiving said at least one discrete electrical connection member, the photovoltaic tile including a first outermost edge formed along the first frame portion and a second outermost edge formed along the second frame portion such that the first and second outermost edges are parallel and not coplanar.

9. Photovoltaic tile according to claim 8, wherein said first outermost edge extends completely along one lateral side of said photovoltaic tile and said second outermost edge extends completely along an opposed lateral side of said photovoltaic tile and said through opening extends through said photovoltaic tile along said first outermost edge.

10. Photovoltaic tile according to claim 8, wherein the mechanical fastener is configured to pass through the further electrical connection member to provide the stable mechanical constraint.

11. Photovoltaic tile according to claim 10, wherein the at least one discrete electrical connection member is formed by a case made of insulating material, and a bushing made of conductive material electrically connected to the photovoltaic module and housed in the case, the mechanical fastener is at least one electrical and mechanical coupling pin, and the bushing and a further bushing of the one of the adjacent tiles is connected by the at least one electrical and mechanical coupling pin.

12. Photovoltaic tile according to claim 11, wherein the electrical and mechanical coupling pin has an area that can be locked in the bushing of the underlying tile, by at least one of a thread connection and bayonet connection.

13. Photovoltaic tile according to claim 12, wherein the electrical and mechanical coupling pin is provided with an insulating tube acting as a gasket which deforms and ensures a tight seal by pushing on the bushing of the underlying tile and the bushing of the photovoltaic tile in a locking operation.

14. Photovoltaic tile according to claim 12, wherein the electrical and mechanical coupling pin is provided with at least one tight sealing gasket consisting of one or more O-rings.

15. Photovoltaic tile according to claim 12, wherein the through opening is closed by an insulating sealing plug when the through opening receives the mechanical fastener therein.

16. Photovoltaic tile according to claim 15, wherein the insulating sealing plug is constrained to the electrical and mechanical coupling pin.

17. Photovoltaic tile according to claim 16, wherein the insulating material of the case of the at least one discrete electrical connection member is at least partially elastically deformable.

18. Photovoltaic tile according to claim 13, wherein the through opening has a diameter greater than a diameter of the electrical and mechanical coupling pin.

19. Photovoltaic tile according to claim 4, wherein the electrical and mechanical coupling pin is integrated in one of the bushing and the further bushing, and wherein one of the bushing and the further bushing has a female casing for receiving the electrical and mechanical coupling pin for completing the mechanical and electrical connection.

20. Photovoltaic tile adapted to be positioned, as partially overlapped to other equal or alike adjacent tiles, on surfaces exposed to sun rays, comprising:

a supporting body;

at least one discrete electrical connection member arranged on the supporting body and configured to allow electrical continuity with one of the adjacent tiles that is suitably interfaced;

a photovoltaic module arranged at least on the supporting body, the at least one discrete electrical connection member including a mechanical fastener made of an electrically conductive material that allows a mechanical and electrical connection with at least one further respective electrical connection member of the one of the adjacent tiles and provides both an electrical connection and a stable mechanical constraint between the photovoltaic tile and the one of the adjacent tiles, wherein the photovoltaic tile includes a through opening that passes completely through the photovoltaic tile for receiving said at least one discrete electrical connection member, the supporting body of the photovoltaic tile comprising a first frame portion and a second frame portion, the first frame portion disposed on and directly contacting the second frame portion in an overlapping manner such that the first and second frame portions are parallel and the photovoltaic tile including a first outermost edge formed only of the first frame portion and a laterally opposed second outermost edge formed only of the second frame portion, wherein each of said first and second outermost edges extend substantially along the entire length of the photovoltaic module and said first outermost edge is configured to overlap said second outermost edge of one of said adjacent tiles, along the entire length of said photovoltaic module.

* * * * *